A. A. FLORY.
AUTO LIGHT DIMMER.
APPLICATION FILED DEC. 9, 1915.
1,204,350.
Patented Nov. 7, 1916.
2 SHEETS—SHEET 1.
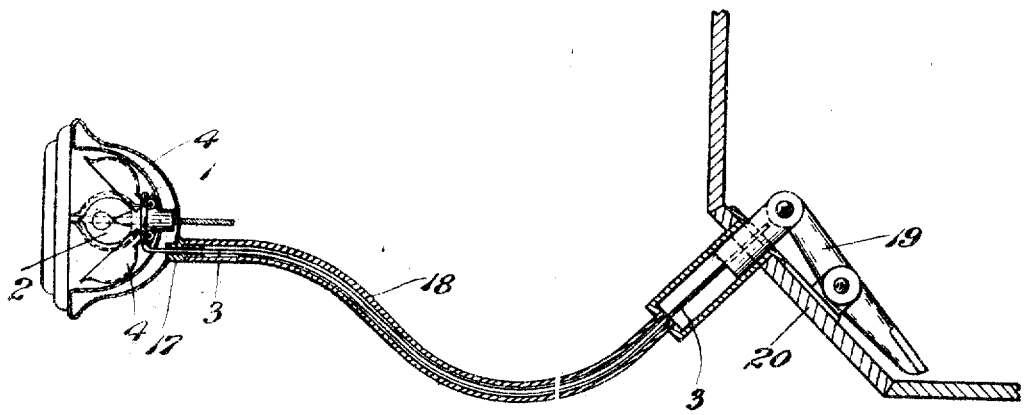
Fig. 1.
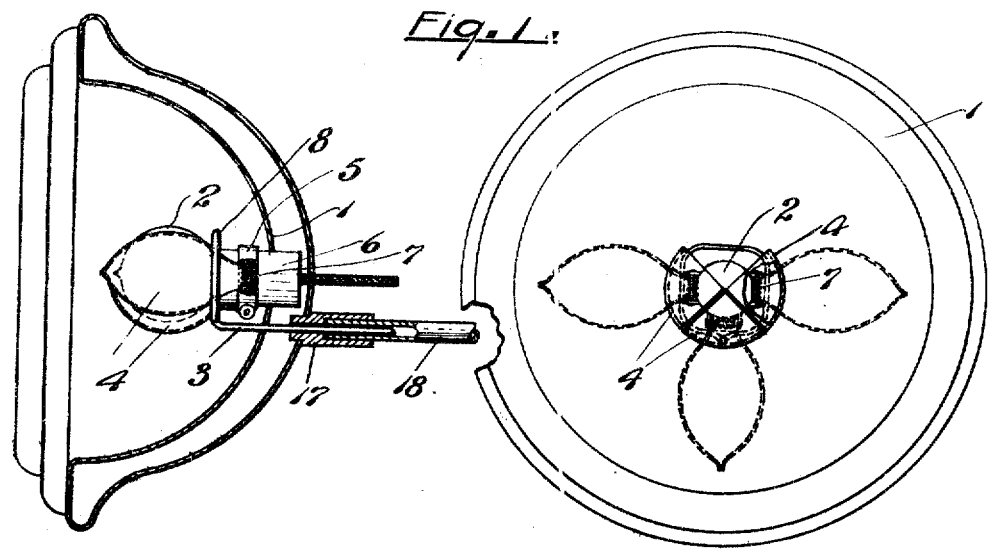
Fig. 2.
Fig. 3.
Inventor
Andrew A. Flory
By Moulton & Livrance
Attorneys.

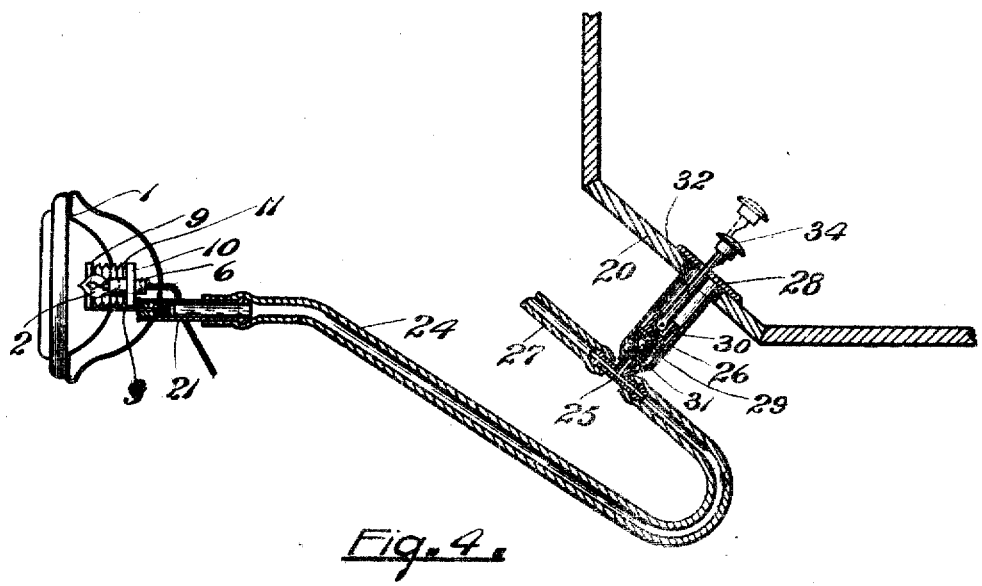
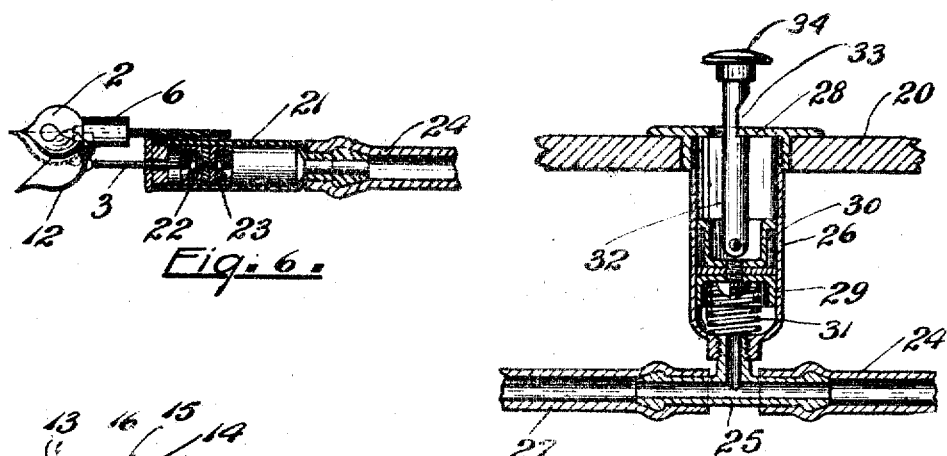
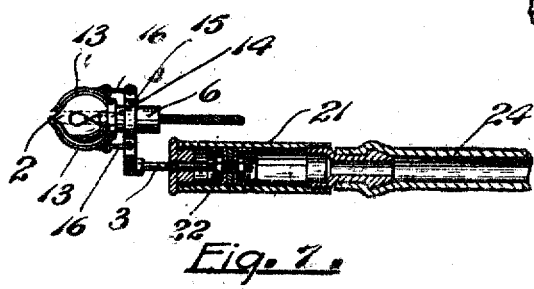

UNITED STATES PATENT OFFICE.

ANDREW A. FLORY, OF GRAND RAPIDS, MICHIGAN, ASSIGNOR TO GRAND RAPIDS DIMMER COMPANY.

AUTO-LIGHT DIMMER.

1,204,350.  Specification of Letters Patent.  Patented Nov. 7, 1916.

Application filed December 9, 1915. Serial No. 66,005.

*To all whom it may concern:*

Be it known that I, ANDREW A. FLORY, a citizen of the United States of America, residing at Grand Rapids, in the county of Kent and State of Michigan, have invented certain new and useful Improvements in Auto-Light Dimmers; and I do hereby declare the following to be a full, clear, and exact description of the invention, such as will enable others skilled in the art to which it appertains to make and use the same.

This invention relates to an auto light dimmer and means for operating the same.

The object and purpose of the invention is to provide devices of this character of novel construction together with effective means for operating the same so that the glare of an approaching head light in a motor vehicle may be lessened and the light dimmed for any desired period of time and thereafter permitted to give light to its full intensity.

The dimming of automobile head lights is especially desirable when an automobile is meeting any other vehicle on the road. The various constructions and operations thereof by which my invention attains these ends are disclosed in the accompanying drawings, illustrating several embodiments of the invention.

In the drawings: Figure 1 is a partial sectional and side elevation illustrating diagrammatically one method of operating, and one construction of dimmer. Fig. 2 is an enlarged sectional and side elevation of the application of the dimmer to the light. Fig. 3 is a front view thereof. Fig. 4 is a view similar to Fig. 1 showing another method of operating the dimmer and another construction of dimmer. Fig. 5 is an enlarged sectional view of the air piston which operates the dimmer in the construction shown in Fig. 4. Figs. 6 and 7 illustrate further modifications of dimmer constructions.

Like reference characters refer to like parts throughout the several views of the drawings.

The head lights of a motor vehicle are positioned at its front and in the drawings the casing of a head light is indicated at 1 with the light bulb 2 located in this casing. In all of the constructions shown, an operating push rod 3 is used which is located immediately back of and below the light bulb. Various types of dimmer constructions are illustrated in the drawings the first of which, shown in Figs. 1, 2 and 3, comprises three sectors 4 pivoted between ears on a ring 5 fastened around the socket 6 with which the light bulb 2 detachably connects. Two of the sectors 4 are normally adapted to swing to the rear under the influence of coil springs 7 while the middle lower section normally drops by gravity so that the normal position of the sectors is that shown in dotted outline in Fig. 3. Surrounding the rear portion of the sectors and also the socket 6 is a ring 8 which is connected to the front end of the push rod 3, it being apparent that if this rod is moved forward the ring contacting with the sectors brings them together in close relation as shown in full lines in Fig. 3 and also as shown in Fig. 2. When the push rod is moved to the rear the sectors are released to occupy their normal position.

In Fig. 4 a modified construction of dimmer is shown, there being a ring 9 secured to the front end of the rod 3 while a block 10 is located back of the bulb 2 and attached to the socket 6. Between the ring 9 and block 10 a collapsible screen 11 is located, it being adapted to expand and collapse with the movement of the ring to outer and inner positions, the movement of this ring occurring simultaneously with the movement of the rod 3. A further modification is shown in Fig. 6 in which a sector 12 is pivotally mounted on the socket 6, normally by gravity occupying the full line position shown in Fig. 6 but which on forward movement of the push rod 3 will take the upper position shown in dotted lines to cover the lower half of the light bulb.

A still further modification of the dimmer is illustrated in Fig. 7 in which a plurality of sectors 13 are mounted on a ring 14 directly back of the light bulb 2 while the push rod 3 is connected to a movable ring 15 loosely mounted around the socket 6, there being link connections 16 between this ring and each of the dimmer sectors 13. It is evident that back and forth movements of the ring 15 serve to open or close the dimmer sectors.

I have shown two methods of operating the push rod. In the first shown in Fig. 1 the push rod 3 extends to the rear through a bushing 17 connected with a light casing 1 and thence through a metal tube 18 connecting at its rear end with a lever 19 which is pivotally mounted between its ends on the inclined foot board 20 of the forward compartment of a motor vehicle. By pressing upon the upper end of lever 19 push rod 3 may be projected in a forward direction to operate the dimmer shown in Fig. 1 and it will be clear that any of the other types of dimmers shown in Figs. 4, 6 and 7 may be operated in the same manner. The friction of rod 3 in the tube 18 will be sufficient to hold the dimmer in place when once operated thereto. To place the dimmer in inoperative position pressure is applied to the lower end of the lever 19.

In Figs. 4, 5 and 6 a pneumatic structure is made use of to operate the push rod, the rod 3 in this modification being of comparatively short length and extending into a cylinder 21. At the rear end of the rod 3 a piston head is provided which includes the valves 22 and 23 extending in opposite directions as shown. The cylinder 21 connects with a tube 24 which may be of any suitable material, the tube at its rear end connecting with a union 25 which communicates with the lower end of a cylinder 26. It will be understood in this connection that, as there are two head lights, the structure which is being described is duplicated for each head light and the tubes 24 come together and unite before reaching the union 25. Similarly in many cases there are in addition to the head lights, dash lights, two in number, and the tube 27 may lead one to each of these lights for operation of a dimmer associated with each of these lights. The upper ends of the cylinder 26 screw into a plate 28 which is attached to the foot board 20. Within the cylinder 26 is a piston having opposed valves 29 and 30 which is normally held in upper position by a strong coil spring 31. An operating rod 32 pivotally connected with the piston passes through an opening in the cap 28 and is provided in one side with a notch 33 and at its outer end with an operating head 34. In the operation of the device pressure is applied to the head 34 and air compressed in front of the piston which passing through the tubes 24 operates against the valve 23 causing a forward movement of the rod 3 to actuate the dimmer. When the operating rod 32 has been forced to downward position it may be moved so that its notch receives a portion of the cap 28 as shown in Fig. 5, thereby holding the parts in the position shown in Figs. 4 and 5. When the light is to be again projected with its full force rod 32 is disengaged from the cap 28 and spring 31 moves the piston head upwardly with considerable force thereby creating a suction in the tube 24 so that the pressure of air against valve 22 causes the operating rod 3 to move to the rear.

Many other modifications in detail of structure may be resorted to without departing from my invention which is defined in the appended claims. Accordingly I consider myself entitled to all modifications falling within their scope.

I claim:—

1. In combination, a light bulb, a dimmer construction including a sector pivotally mounted adjacent the bulb and adapted in one position to partially cover said bulb, a push rod mounted adjacent the bulb, means to move the rod back and forth and operative engagement between said rod and sector for turning the sector to operative position on forward movement of the rod.

2. In combination, a light bulb, a dimmer construction including a plurality of sectors pivotally mounted adjacent the bulb and adapted in one position to partially cover the bulb, a push rod movably mounted back of the bulb, a ring secured thereto, said ring having operative engagement with the sectors to close them on forward movement of the push rod, and means for moving the rod back and forth.

3. In combination, a light bulb, a dimmer construction movably mounted adjacent the bulb, a push rod mounted back of the bulb operating the dimmer construction to partially cover the bulb on forward movement of the rod, a cylinder, a piston on the rod located in the cylinder, a tubular connection to the cylinder, and means to alternately raise and lower the pressure in said tube above and below normal atmospheric pressure, substantially as described.

4. In combination, a light bulb, a dimmer construction, movably mounted adjacent the bulb, a push rod mounted back of the bulb operating the dimmer construction on forward movement of the rod to partially cover the bulb, a cylinder, a piston on the rear end of the rod located in the cylinder, a tubular connection to the cylinder, a cylinder connected to the opposite end of the tubular connection, a piston thereon, an operating rod secured thereto having a notch in one side thereof, a cap to the cylinder through which the rod passes, and having a part adapted to seat in said notch when the operating rod is moved to one position, and a coiled spring interposed between the piston and end of the cylinder tending to return the piston to normal position.

In testimony whereof I affix my signature.

ANDREW A. FLORY.